Oct. 10, 1967 M. A. CHAVANNES 3,346,438
METHOD AND APPARATUS FOR MAKING CUSHIONING AND
INSULATING MATERIAL
Filed Sept. 10, 1963 2 Sheets-Sheet 1
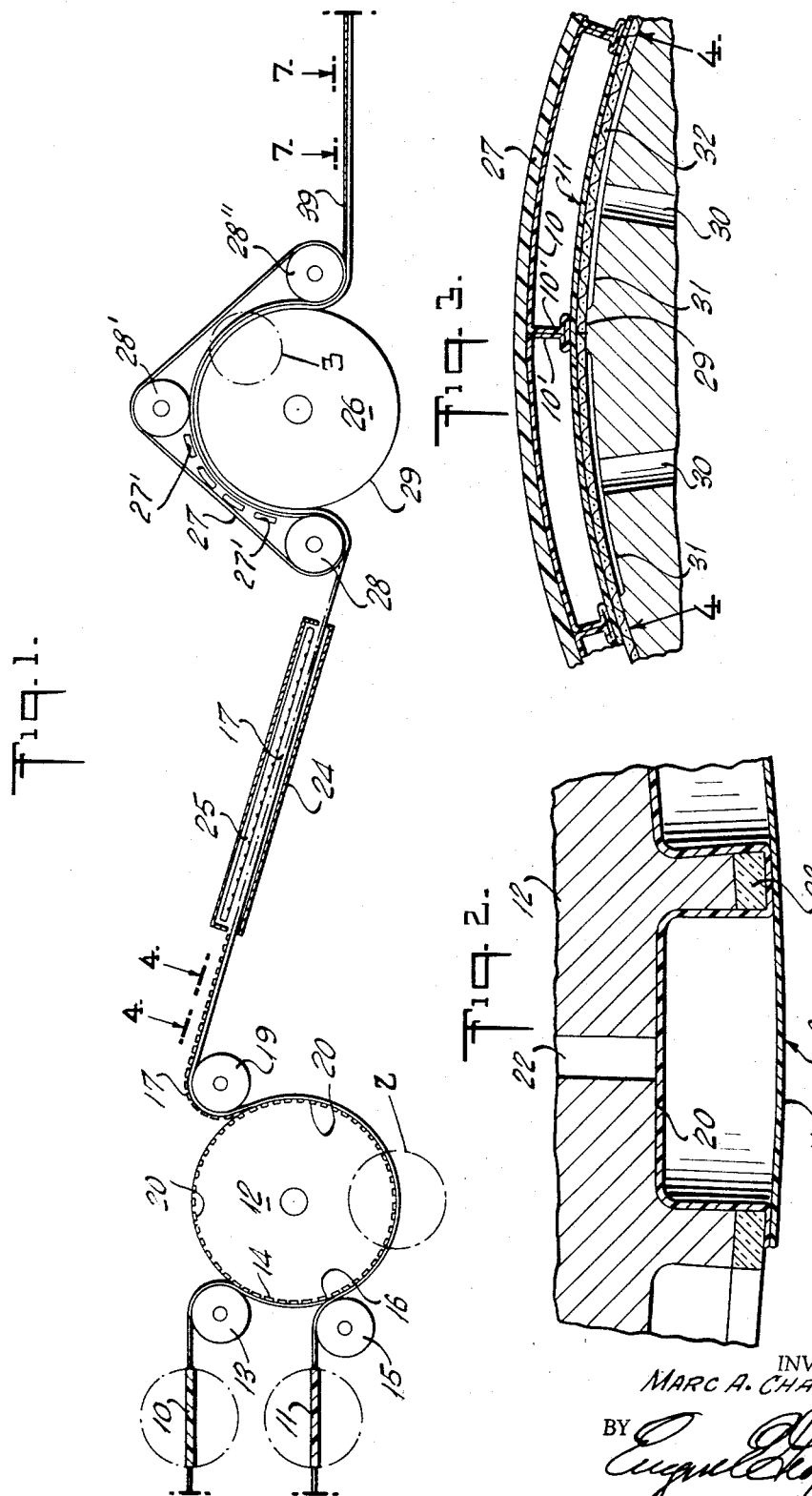
INVENTOR.
MARC A. CHAVANNES
BY
ATTORNEY Oct. 10, 1967  M. A. CHAVANNES  3,346,438
METHOD AND APPARATUS FOR MAKING CUSHIONING AND
INSULATING MATERIAL
Filed Sept. 10, 1963  2 Sheets-Sheet 2

INVENTOR.
MARC A. CHAVANNES
BY
ATTORNEY

United States Patent Office 3,346,438
Patented Oct. 10, 1967

3,346,438
METHOD AND APPARATUS FOR MAKING CUSHIONING AND INSULATING MATERIAL
Marc A. Chavannes, Fort Lee, N.J., assignor to Sealed Air Corporation, Hawthorne, N.J., a corporation of New Jersey
Filed Sept. 10, 1963, Ser. No. 307,966
7 Claims. (Cl. 156—210)

This invention relates to composite cushioning and insulating materials and more specifically concerns a new and improved cushioning material and the method and apparatus for the manufacture thereof.

Insulating and cushioning materials made of a variety of plastics are normally fabricated of two layers, at least one of which is provided with a plurality of embossments forming sealed pockets within the material. These pockets are necessarily arranged in spaced relationship one to the others with the result that any individual pocket may be stressed independently of the surrounding pockets. In instances wherein the material is used as an insulating element, the areas between the pockets do not afford the insulating characteristics of the areas containing pockets. This invention overcomes these difficulties and provides a material affording both improved cushioning as well as insulating characteristics.

Another object of this invention resides in a new and improved method and apparatus for manufacture of cushioning materials, having improved cushioning and insulating characteristics.

Another object of this invention embraces the provision of a new and improved method and apparatus for manufacture of cushioning materials wherein wall portions of individual cells are sealed one to another for greater strength.

Still another object of this invention resides in the provision of a new and improved plastic cushioning material wherein a plurality of hermetically sealed air pockets are joined one to the others to form in effect a sealed honeycomb structure.

Another object of the invention resides in the provision of a new and improved method and apparatus for the manufacture of cushioning materials wherein the wall portions of the individual cells extend outwardly to and in close proximity to the walls of the adjoining cells.

A further object of this invention resides in a new and improved material wherein the top surfaces of embossments provide a substantially continuous surface in generally parallel relationship to the layer sealing the embossments.

A still further object of this invention resides in the provision of a new and improved cushioning material wherein a plurality of embossments are joined one to the others to form a relatively homogenous cellular structure.

The above and other objects and advantages of this invention will become more apparent from the following description and accompanying drawings forming part of this application.

In the drawings:

FIGURE 1 is a diagrammatic illustration of one embodiment of apparatus in accordance with the invention.

FIGURE 2 is an enlarged fragmentary section of the embossing roller of FIGURE 1 having a portion of embossed material thereon.

FIGURE 3 is an enlarged fragmentary section of the compression roller and pressure belt of FIGURE 1.

Figure 4:
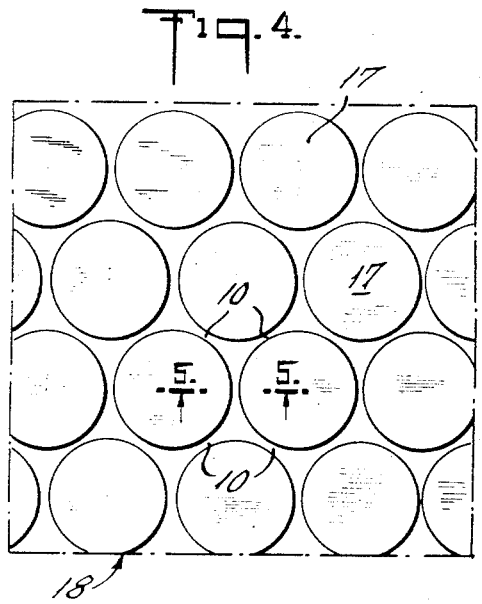
FIGURE 4 is a plan view of the cushioning material with spaced embossments as it is fed onto the compression roller.

The improved material in accordance with the invention embodies at least two layers of a plastic material fused one to the other with at least one of the layers having discrete embossments extending from one side thereof and in closely spaced relationship. The side walls of each embossment are fused to the side walls of adjoining embossments so that the completed material affords the effect of a pair of spaced layers of plastic having a honeycomb of air cells incorporated therebetween. With this arrangement, each air cell or embossment is laterally supported by the surrounding embossments and as a result a substantially stronger, more durable cushioning material is obtained. Furthermore, by the elimination of the spaces between the adjoining embossments, the insulating qualities of the material are substantially improved, and there are no cracks or crevasses for the accumulation or collection of foreign matter.

While the material as described above may be fabricated in a variety of modes, one method and apparatus is illustrated in FIGURES 1 to 3. In these figures, the two layers of plastic material, which may be sheets of a homogenous material or may comprise previously laminated sheets of plastic materials having different properties, are generally denoted by the numerals 10 and 11. One procedure for preheating the layers 10 and 11 prior to treatment in accordance with the invention is disclosed in U.S. Patent No. 3,142,599, entitled Method and Apparatus for Making Laminated Cushioning Material and the Resultant Products, granted July 28, 1964. In the event the layers are extruded immediately prior to embossment and lamination in accordance with this invention, it may be desirable to lower the temperature of the extruded layers so that they will have the proper embossing and laminating temperatures to effect the desired result.

The layer or lamina 10 is fed onto the embossing roller 12 by means of the roller 13, which if necessary can be heated to raise or at least maintain the temperature of the layer 10 at its embossing and laminating temperature. The lamina 10 is embossed by roller 12 which preferably includes vacuum means for creating a plurality of closely spaced depressions. The second lamina or layer 11 is fed onto the surface of the embossing roller 12 and in overlying relationship to lamina 10 by roller 15, which, similar to roller 13, may be provided with heating elements to raise or at least maintain the temperature of lamina 11 at its fusing temperature. Roller 15 may be arranged to exert a slight pressure against the two laminae 10 and 11 as they are brought into overlying relationship at 16, though in most applications utilizing thin plastic layers, the roller 15 need not be in pressure contact with the layers 10 and 11. The lamina 11 is hermetically fused to the unembossed portions of lamina 10, hermetically sealing the embossments 17 which are clearly visible in the laminate 18 as it is stripped from the embossing roller 12 by stripping roller 19.

A magnified partial cross section of the embossing roller is shown in FIGURE 2, having a portion of the laminated material 18 thereon. Although the embossing depressions 20 in the surface of the embossing roller 12 are shown to have cylindrical configurations, it is understood, of course, that these depressions could be of a different size and shape, such as may be used, for example, in connection with the forming of hexagonal embossments. The embossing roller 12 is provided with central vacuum means from which a plurality of passages 22 communicate with each embossing depression 20. By means of this vacuum, the soft lamina 10 is drawn into the depressions during the process of embossing. The surface area of the embossing roller 12 surrounding the depressions 20 may carry an adhesion-resisting layer 23 of silicone or other similar material. These coated surfaces prevent the heated lamina 10 from adhering to the roller 12 as the lamina is molded and subsequently fused with lamina 11 at 16.

Stripping roller 19 removes the embossed cushioning material 18 from the roller 12 after the material has been cooled to complete the sealing procedure. The material 18 is then conveyed through an oven 24 having a radiant heater 25 for heating at least the surface of the embossments 17 to a temperature in the vicinity of the melting point of the plastic material. By the use of heat rays of selected wavelength, the major portion of the heat will be absorbed by layer 10 and the fluid entrapped in the sealed embossments 17 will receive a minimum quantity of heat, thereby minimizing the expansion of the fluid.

The heated laminate 18, upon leaving the oven 24, is directed about a roller 28 and onto the drum 26. The roller 28 together with the cooperating rollers 28' and 28" carries a belt 27 which rides over the surface of the drum 26 and constitutes a compression element for compressing the laminated material 18 as it passes between the belt and the drum 26. If desirable, radiant heaters 27' may be used to maintain the temperature of the embossments and insure a positive seal. In this case it is preferable to utilize a perforated belt 27 of suitable insulating material. One or more of the rollers 28, 28' and 28" may also be cooled to maintain the desired belt temperature whether it be metallic or insulating in order to produce a uniform product.

The rollers 28, 28' and 28" are driven at a speed so that the belt 27 will have a velocity corresponding to the peripheral velocity of the drum 26. Since the embossed side of the laminate 18 is heated by the oven 24, when the material is placed under compression, the embossments or cells are compressed and the side walls of each cell are urged into contact with the side walls of adjoining cells and are held until the laminate is cooled and the seal is effected. For this purpose, it is desirable to cool the drum or compression cylinder 26.

In some instances it may be desirable to provide means for holding the laminated material 18 firmly on the compression roller 26, and for this purpose, a vacuum system may be employed. Such a vacuum system is shown in FIGURE 3 which constitutes a magnified fragmentary section of the roller 26 and cooperating belt 27. The roller 26 may be provided with a central vacuum manifold and a plurality of radially disposed tubes 30 connected with the manifold and opening into the surface of the roller. An area of the surface 29 of rollers 26 surrounding each conduit 30 is preferably recessed or serrated as denoted by the numeral 31, and an overlying layer of fabric or other porous material 32 is then placed on the periphery of the roller. In this way, the vacuum from the spaced conduits 30 is distributed throughout the surface of the roller and when the laminated structure 18 engages the surface, it is held firmly in place by the vacuum until the compression operation has been completed. By arranging appropriate valving means such as is shown for instance in United States Patent No. 3,208,898, entitled Method and Apparatus for Embossing and Laminating Materials, granted Sept. 28, 1965, the vacuum can be terminated just prior to the point of removal of the finished product from the roller 26 by means of the roller 28".

With further reference to FIGURE 3, it will be observed that the embossments in layer 10 are compressed to cause the side walls 10' of adjoining embossments to firmly contact each other and form an inverted T configuration at the joinder of the layer 10 with the layer 11. Furthermore, the top surface of the layer 10 becomes substantially continuous and uninterrupted except for minor discontinuities at the joinder of each set of three cells.

Figure 6:
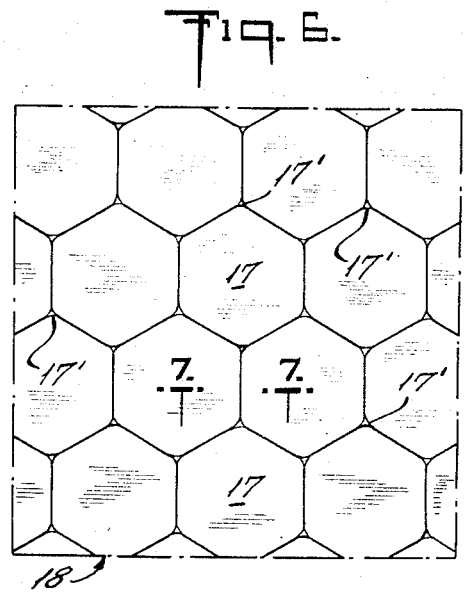
FIGURE 6 is a plan view of the improved cushioning material in accordance with the invention.
Figure 5:
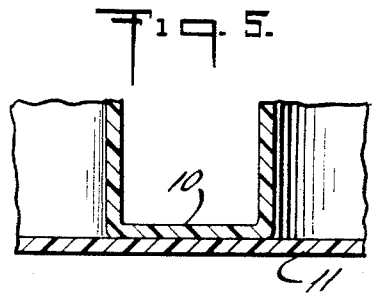
FIGURE 5 is a cross-sectional view of FIGURE 4 taken along the line 5—5 thereof.
Figure 7:
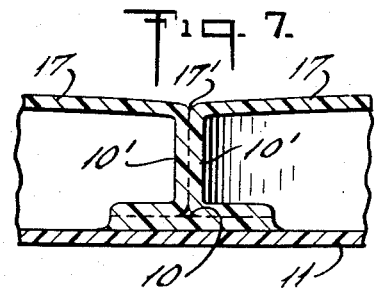
FIGURE 7 is a cross section of the material shown in FIGURE 6 taken along the line 7—7 thereof.

FIGURES 4 through 7 show the steps in the process of fabricating the material in accordance with the invention somewhat more clearly. In FIGURE 4, which is a plan view of the embossed material, it will be observed that the embossments 17 are in closely spaced relationship throughout the surface of the laminated structure 18, and while they are shown in circular or cylindrical configuration, it is evident that the embossments could be rectangular, hexagonal or of any other suitable shape. A cross-sectional view of the structure of FIGURE 4 is shown in FIGURE 5. This is an enlarged view which illustrates the general configuration of the embossments 17 and the fusing of the areas between the embossments 17 with the backing layer 11. When the structure shown in FIGURES 4 and 5 is subjected to compressive stress as previously described, a configuration such as that shown in FIGURES 6 and 7 is obtained. The embossments 17 assume an essentially hexagonal configuration since the side walls of each embossment are joined to the adjoining side walls of the surrounding embossments. While all of the embossments are joined firmly with the surrounding embossments, slight depressions are formed at the corners 17' of each hexagon which gives the resultant product a slight ripple effect on the embossed surface. This ripple however is very slight, and for all practical purposes, the resultant structure gives the appearance of a pair of spaced layers of plastic material having cellular-like formations therebetween.

An enlarged cross-sectional view of the structure of FIGURE 6 is shown in FIGURE 7, and it will be seen that the side walls 10' of adjoining embossments 17 are firmly fused with only a slight depression at the point 17'.

The improved cushioning material as described above affords a stronger and more durable product since each of the air cells or embossments 17 is radially supported by the surrounding embossments, and there is no place for the accumulation of dirt or other foreign material. Furthermore, by reason of the joinder of the side walls, improved insulating characteristics are obtained. The cellular material in accordance with the invention may also be subjected to further embossing processes which makes it particularly adaptable for use in packaging and other purposes.

Figure 8:
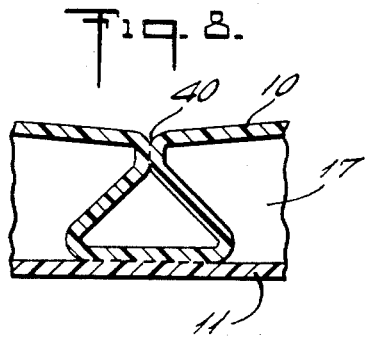
FIGURES 8 and 9 are cross-sectional views along the lines of FIGURES 7 and showing modified forms of the improved cushioning material in accordance with the invention.
Figure 9:
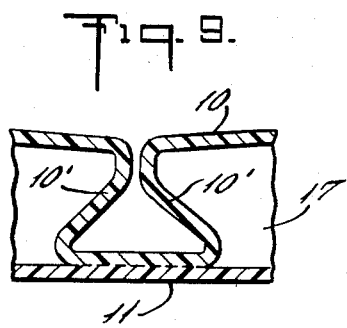

Modified embodiments of the invention are shown in FIGURES 8 and 9. These are cross-sections of material taken in the same plane as FIGURE 7 but showing alternate modes in which the side walls of the embossments 17 may be formed. It was pointed out in connection with FIGURE 7 that the side walls 10' of the embossments were sealed substantially throughout their extent as shown in that figure. In some cases it may be desirable to seal only a portion of the side walls 10' and this partial sealing of the side walls is shown at 40 in FIGURE 8. To accomplish this mode of sealing, the pressure effected by the belt 27 in FIGURE 1 is reduced so that the embossments 17 are compressed just enough to bring the upper edges of the adjoining embossments into contact one with the others. Under certain conditions, it may be desirable to provide a material configuration wherein the side walls of the embossments 17 are disposed in close proximity one to the others but are not in effect sealed. A somewhat softer cushioning material is obtained throughout initial degrees of compression, though with substantial compression, the walls do move in contact one with the others. This form of the invention is shown in FIGURE 9, and it will be observed that a smaller gap exists between the side walls 10' of the embossments 17. As in the case of the embodiment shown in FIGURE 8, the structure in FIGURE 9 is obtained by further decreasing the pressure effected by the belt 27.

The material in accordance with the invention may be made in continuous sheets of any desired width and is useful for a wide variety of applications such as packaging, padding and insulating. In the latter case, 48″ material is particularly adaptable for use in the insulation of walls as the vertical studs are customarily placed on 12-inch centers. In any event, the material need only be secured with enough fasteners to prevent it from sagging or shifting in the course of installation of the inner wall surface. In certain cases, it may be desirable to puncture those cells overlying each stud to avoid possible deformation of the wall surface when light wall board is used. Actual observations have indicated that while insulation between the studs is important, a substantial amount of heat will be conducted by the studs so that the utilization of a plastic covering on the studs affords a substantial improvement in reduction of heat conduction. This prevents loss of heat in the wintertime and also prevents the transfer of heat from the outer walls of the structure to the inner walls in the summertime.

While only certain embodiments of the invention have been illustrated and described, it is apparent that modifications, alterations and changes may be made without departing from the true scope and spirit thereof as defined by the appended claims.

What is claimed is:

1. The method of fabricating cushioning material comprising the steps of heating a first plastic film, molding said heated film to provide a plurality of closely spaced embossments, heating a second plastic film to a fusing temperature and feeding it into overlying relationship with the unembossed portions of said first film to fuse said films throughout the unembossed portions of said first film and form a unitary structure having a plurality of closely spaced, hermetically sealed air pockets, heating at least the embossed surface of said structure to the melting point of said plastic films, compressing said heated structure to fuse side walls of adjoining embossments one to the others, and cooling the resultant cushioning material.

2. The method for fabricating cushioning material comprising the steps of heating two plastic laminae individually and simultaneously at least until one surface of each of said laminae is heated to the vicinity of the melting point, providing one of said laminae with a plurality of closely spaced and uniformly distributed embossments, sealing said embossments by bringing the other of said plastic laminae into overlying pressure relationship with the unembossed surface of said one lamina with the molten surfaces of said two laminae facing each other to form a laminate having closely spaced fluid containing pockets evenly distributed throughout, reheating at least the embossed surface of said laminate to the vicinity of the melting point of said plastic laminae, compressing the heated laminate to uniformly fuse side wall portions of adjacent embossments one to the other, and cooling the resultant cushioning material.

3. The method of processing an embossed plastic cushioning material comprising the steps of heating at least the embossed surface of said cushioning material to the vicinity of the melting point of the plastic material, subjecting said material to compressive stress to fuse the confronting side walls of said embossments one to the other and then cooling said material.

4. Apparatus for manufacturing insulative cushioning material comprising means for embossing a first film of plastic, means for bonding a second film of plastic to the unembossed portions of said first film to form a unitary structure having hermetically sealed pockets therein, means for providing at least the embossed film of said unitary structure with a bondable surface, and means for uniformly expanding the embossments in the plane of said material to permanently bond confronting side walls of adjacent embossments one to the other.

5. Apparatus for manufacturing insulative cushioning material comprising means for embossing a first heated layer of plastic, means for bringing a second heated layer of plastic into overlying relationship with the unembossed portions of said first layer, means for urging said layers on said embossing means into pressure contact to form a unitary structure containing a plurality of closely spaced hermetically sealed air pockets, means for stripping the composite material from said embossing means, means for heating at least the embossed surface of said composite material to the vicinity of the melting point thereof, means for exerting controlled pressure on said material to fuse confronting side walls of adjacent embossments one to the other, and means for stripping said material from said compressing means.

6. Apparatus for manufacturing insulating and cushioning material comprising an embossing roller having a plurality of closely spaced depressions in its surface, vacuum means associated with said roller and communicating with each of said depressions, means for feeding a first plastic film at a fusing temperature onto said embossing roller, means for bringing a second plastic film at a fusing temperature into overlying pressure relationship with the unembossed portions of said first film on said embossing roller to fuse said films into a unitary structure having a plurality of closely spaced and hermetically sealed pockets therein, a stripping roller in close proximity of said embossing roller for removal of said unitary structure from said embossing roller, means for heating at least the embossed surface of said structure to the vicinity of the melting point of said integral films, and means for exerting uniform pressure over a substantial area of said heated structure to fuse the side walls of adjacent embossments one to the other to form a resultant material having two substantially smooth outer surfaces, and evenly spaced, double strength walls defining said pockets.

7. Apparatus for manufacturing an insulating and cushioning material comprising means for embossing a first film of plastic, means for bringing a second film of plastic into overlying relationship with the unembossed portions of said first film, the last said means including means for urging said films into contact to form a unitary structure having closely spaced and evenly distributed hermetically sealed pockets therein, a heating chamber including elements for raising the temperature of at least the embossed surface of said unitary structure to the vicinity of the melting point of said plastic films, a relatively large compression roller including a porous covering thereon, vacuum conduits in said compression roller and opening into the surface thereof, a continuous adhesion-resisting belt including driving and tension rollers therefor overlying at least part of the periphery of said compression roller, means for feeding said unitary structure between said belt and compression roller, said belt exerting substantial compressive stress on said structure to expand said embossments laterally, and cooling means for lowering the temperature of the resultant insulative cushioning material.

References Cited

UNITED STATES PATENTS

| 2,020,639 | 11/1935 | Grayson et al. | 161—123 X |
| 2,556,011 | 6/1951 | Swayze et al. | 156—595 X |
| 2,776,452 | 1/1957 | Chavannes | 264—90 X |

FOREIGN PATENTS 908,579  10/1962  Great Britain.

EARL M. BERGERT, *Primary Examiner.*

H. F. EPSTEIN, *Assistant Examiner.*